United States Patent [19]

Furuta et al.

[11] Patent Number: 5,459,715
[45] Date of Patent: Oct. 17, 1995

[54] TRIBUTARY INTERFACE OF DIGITAL TRANSMISSION APPARATUS

[75] Inventors: Tomohisa Furuta, Osaka; Hiroshi Yoshida, Kawasaki, both of Japan

[73] Assignee: Fujitsu Limited, Kanagawa, Japan

[21] Appl. No.: 187,100

[22] Filed: Jan. 25, 1994

[30] Foreign Application Priority Data

Aug. 18, 1993 [JP] Japan .................................. 5-204319

[51] Int. Cl.$^6$ ...................................................... H04J 3/14
[52] U.S. Cl. ............................ 370/16; 370/68; 370/58.2; 370/55; 395/182.02; 395/308
[58] Field of Search ............................. 370/16, 68, 85.1, 370/94.1, 55, 13, 58.2; 371/8.2, 11.2

[56] References Cited

U.S. PATENT DOCUMENTS 5,016,244  5/1991  Massey, Jr. et al. ...................... 370/16
5,216,666  6/1993  Stalick ................................. 371/8.2 X Primary Examiner—Douglas W. Olms
Assistant Examiner—Russell W. Blum

[57] ABSTRACT

A tributary interface, which performs interfacing between a high order transmission system and itself and includes a working tributary interface and a protection tributary interface as a pair for time slot interchanging with respect to the high order transmission system, is constructed so that the working tributary interface and the protection tributary interface can be operated independently. Thereby, in a time slot interchange unit of the SDH transmission system, the number of interfaces operable at a lower order side is temporarily increased so as to be able to cope with a request for temporarily increasing the number of interfaces from a user.

3 Claims, 4 Drawing Sheets

TRIBUTARY INTERFACE OF DIGITAL TRANSMISSION APPARATUS

BACKGROUND OF THE INVENTION

1. Field of the Invention

The present invention relates to an improvement in a tributary interface of a digital transmission apparatus, and particularly to a tributary interface of the SDH transmission apparatus for realizing the ISDN.

2. Description of the Related Art

The ISDN (Integrated Services Digital Network) is provided, as a real transmission system, by a time-division multiplexing known as SDH (Synchronized Digital Hierarchy). In such a conventional SDH transmission apparatus, time slot interchanging is carried out by a tributary interface.

In a conventional time slot interchange unit, a redundant configuration, in which tributary interfaces of the number requested from a user are constructed so that each working interface and each protection interface are made to be a pair, was adopted.

FIG. 1 is a block diagram showing a schematic configuration of a time slot interchange unit and a tributary interface of a conventional SDH apparatus. In addition, for simplifying the explanation, an example is shown in FIG. 1 in which one tributary interface unit is connected to the time slot interchange unit.

In FIG. 1, reference numeral 10 designates a time slot interchange unit. The unit 10 is connected to a portion between a line interface 11 of a group 1 side of the high order group transmission system and a line interface 12 of a group 2 side of the high order group transmission system.

Reference numeral 1 designates a tributary interface unit connected to the time slot interchange unit 10, in which a working tributary interface 1W and a protection tributary interface 1P are built in.

In a conventional interface unit, usually, only the working tributary interface 1W is operated, which is connected to the time slot interchange unit 10. That is, the controlling overhead portion of a signal inputted to the working tributary interface 1W from the transmission system through the time slot interchange unit 10, is inputted to an overhead interface 2 to be used for synchronous control or the like. Other data portion of the signal, after the signal of the necessary channel has been extracted, is outputted to a terminal unit (not shown), and a signal outputted to the tributary interface unit 1 from the terminal unit is outputted after being multiplexed to predetermined channels, or a channel having no relation to the tributary interface unit 1 is sent out again to the transmission system intact from the time slot interchange unit 10.

Such conventional time slot interchange unit is not suitable for a situation which occurs when a user requests to increase the number of the tributary interfaces for the purpose of changing the specification or expanding the system. In reality, there is no countermeasure other than to newly design an equipment in which the requested number of interfaces would be incorporated, and therefor considerable time for developing and cost have been required to do so.

SUMMARY OF THE INVENTION

It is an object of the present invention to provide a tributary interface unit of a digital transmission apparatus capable of coping with a user's request for temporarily increasing the number of interfaces by temporarily increasing the number of operable interfaces at the low order group side by making each pair of the interfaces which are in the state of working and protection relative to each other at the tributary side, that is, at the low order group side of the time slot interchange unit of the SDH transmission apparatus, operate independently from each other.

A tributary interface unit of the digital transmission apparatus of the present invention is the one which performs interfacing between the high order transmission system and itself by usually operating only the working tributary interface in the pair of the working tributary interface and the protection tributary interface for the time slot interchanging with respect to the high order transmission system, wherein the working tributary interface and the protection tributary interface are operated independently from each other.

In the tributary interface unit of the digital transmission apparatus of the present invention, the working tributary interface and the protection tributary interface each performs interfacing with respect to the high order transmission system.

The above and further objects and features of the invention will more fully be apparent from the following detailed description with accompanying drawings.

DESCRIPTION OF THE PREFERRED EMBODIMENTS

Figure 1:
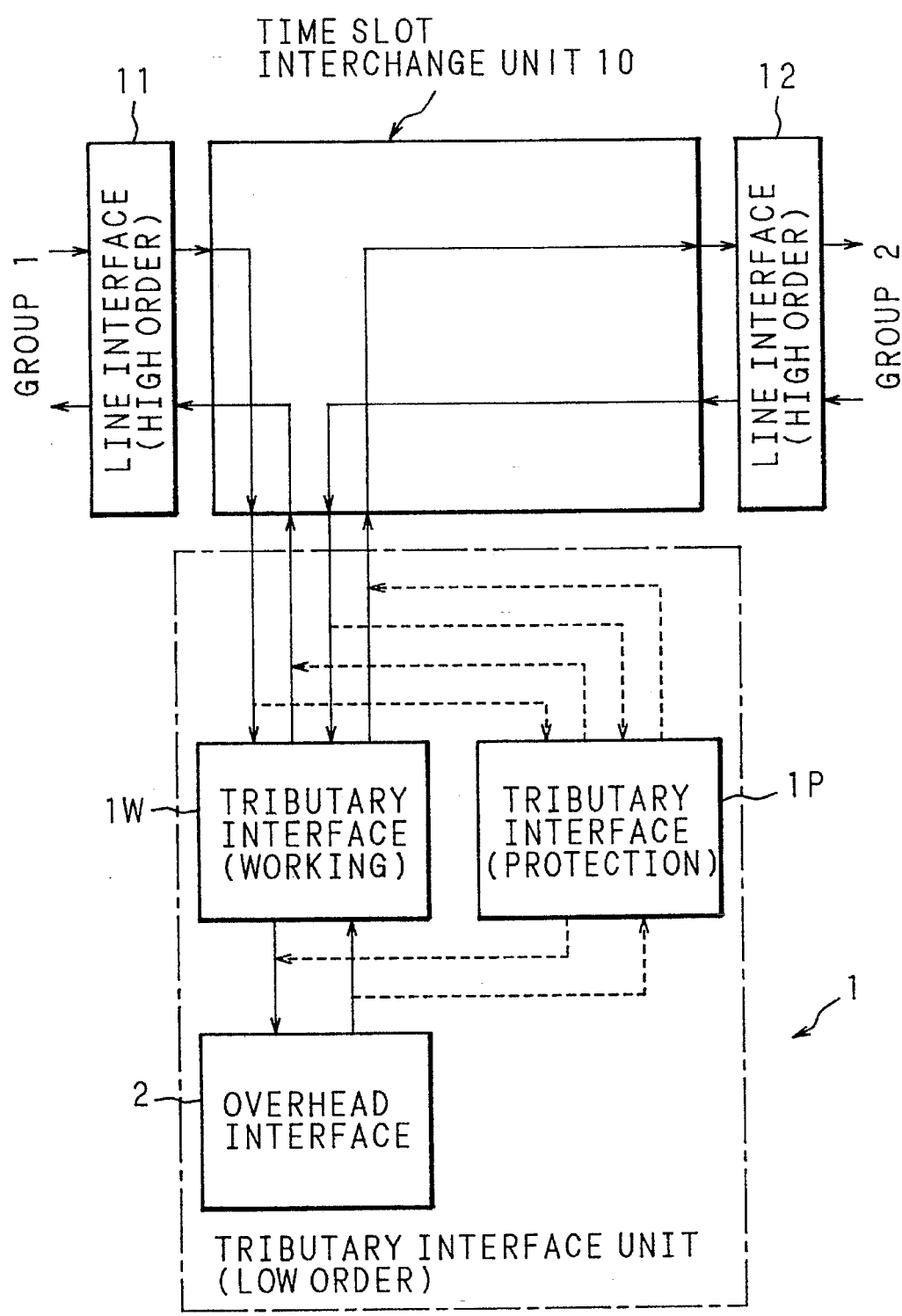
FIG. 1 is a block diagram schematically showing a configuration of a conventional time slot interchange unit and tributary interface.

In the following, explanation will be made of the present invention referring to the drawings thereof.

Figure 2:
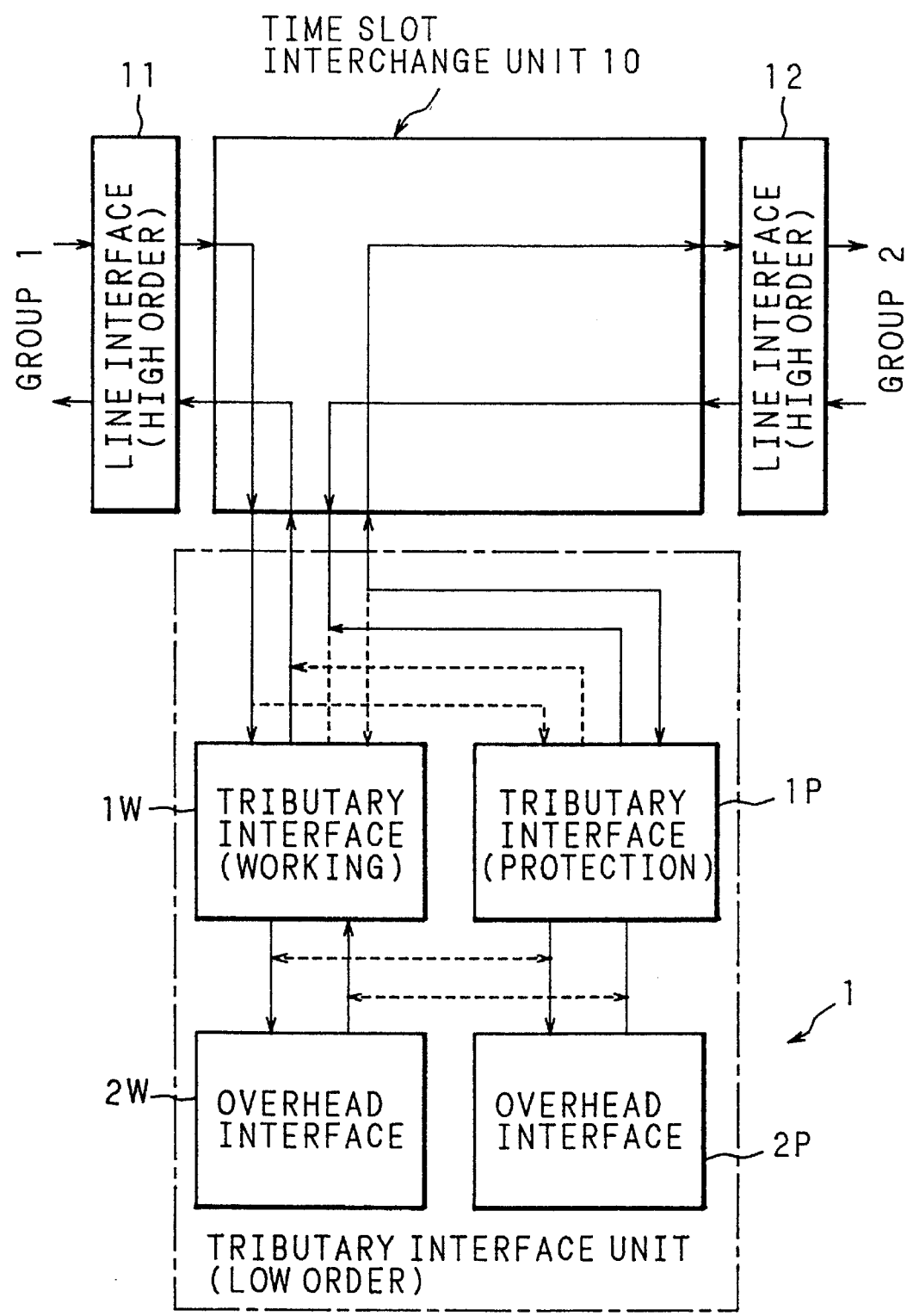
FIG. 2 is a block diagram schematically showing a configuration of a time slot interchange unit of the SDH apparatus which involves a tributary interface of a digital transmission apparatus of the present invention.

The block diagram of FIG. 2 shows a schematic configuration of a time slot interchange unit of the SDH apparatus which includes a tributary interface of a digital transmission apparatus of the present invention.

In addition, for simplifying the explanation, in an example shown in FIG. 2, one tributary interface unit is connected to the time slot interchange unit.

In FIG. 2, reference numeral 10 designates a time slot interchange unit. Unit 10 is connected to a portion between a line interface 11 of a group 1 side of the high order group transmission system and a line interface 12 of a group 2 side of the high order group transmission system.

Numeral 1 designates a tributary interface unit of a digital transmission apparatus of the present invention connected to the time slot interchange unit 10.

In the present invention, in the tributary interface unit 1, basically a working tributary interface 1W and a protection tributary interface 1P are built in the same way as in the conventional unit. In the conventional unit, only the working tributary interface 1W is usually connected to the time slot interchanging unit 10 to be operated. However, in the present invention, both of the working tributary interface 1W and the protection tributary interface 1P are constructed so as to operate independently.

That is, in the tributary interface unit 1 of basically the same redundant configuration as the conventional one, provided with both the working and protection tributary interfaces 1W and 1P, both the working and protection tributary interfaces 1W and 1P can operate independently by controlling the input/output buffers as first through fourth switching means of the tributary interfaces 1W and 1P. In other words, the working/protection redundant configuration is dissolved temporarily to make each of the tributary interfaces 1W and 1P operate as a working interface, to thereby increase the number of interfaces.

In addition, in the present invention, in order to operate both tributary interfaces 1W and 1P independently, an overhead interface 2W for the working tributary interface 1W and an overhead interface 2P for the protection tributary interface 1P are provided.

By adopting such a configuration, as shown by solid lines in FIG. 2, an overhead portion for controlling of a signal inputted to the working tributary interface 1W of the tributary interface unit 1 from the transmission system of the group 1 side through the line interface 11 and the time slot interchange unit 10, is inputted to the overhead interface 2W to be used for synchronous control or the like. Other data portion of the signal, after the signal of the necessary channel has been extracted, is outputted to a terminal unit (not shown). A signal outputted from the terminal unit to the working tributary interface 1W of the tributary interface unit 1 is outputted after being multiplexed to predetermined channels, or a channel having no relation to the tributary interface unit 1 and is sent out again intact to the transmission system from the working tributary interface 1W through the time slot interchange unit 10 and the line interface 11.

On the other hand, an overhead portion for controlling, of a signal inputted to the protection tributary interface 1P of the tributary interface unit 1 from the transmission system of the group 2 side through the line interface 12 and the time slot interchange unit 10, is inputted to the overhead interface 2P to be used for synchronous control or the like. Other data portion of that signal, after the signal of the necessary channel is extracted, is outputted to a terminal unit (not shown), and a signal outputted to the protection tributary interface 1P of the tributary interface unit 1 from the terminal unit is outputted after being multiplexed to predetermined channels, or a channel having no relation to the tributary interface unit 1 and is sent out again intact to the transmission system from the protection tributary interface 1P through the time slot interchange unit 10 and the line interface 12.

Figure 3:
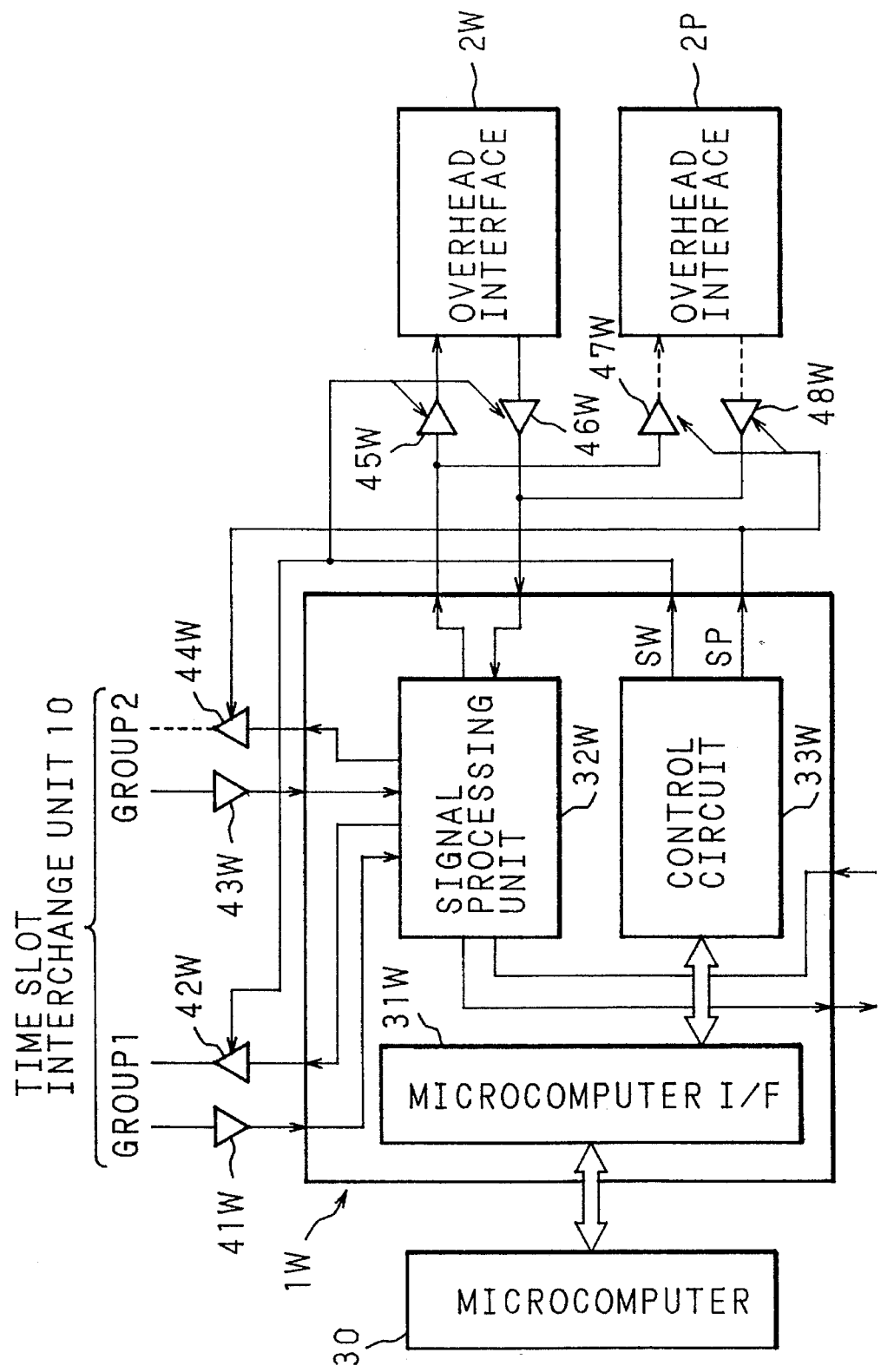
FIG. 3 is a block diagram showing a specific configuration of an embodiment of a working tributary interface of the present invention.

FIG. 3 is a block diagram showing a concrete configuration of one embodiment of a tributary interface for realizing a configuration as described above of the working tributary interface 1W shown in FIG. 2.

In FIG. 3, reference numeral 30 designates a microcomputer which controls the whole apparatus.

In the working tributary interface 1W, a microcomputer interface (I/F) 31W for sending/receiving a signal between the microcomputer 30 and tributary interface 1W is built in the tributary interface. The signal received from the microcomputer 30 by the microcomputer interface 31W is applied to the control circuit 33W operated as a control means.

The control circuit 33W controls each buffer in accordance with a signal sent from the microcomputer 30.

Between the time slot interchange unit 10 and the working tributary interface 1W, signals are transmitted/received through four signal lines. At the group 1 side, a buffer 41W is disposed at an input signal line from the line interface 11 and a buffer 42W is disposed at an output signal line to the line interface 11. At the group 2 side, a buffer 43W is disposed at an input signal line from the line interface 12 and a buffer 44W is disposed at an output signal line to the line interface 12, respectively.

In addition, two buffers 41W and 43W among the four buffers 41W, 42W, 43W and 44W are always in on-state. The buffer 42W for outputting at the group 1 side becomes on-state only when a control signal SW outputted from the control circuit 33W is significant, and the buffer 44W for outputting at the group 2 side becomes on-state only when a control signal SP outputted from the control circuit 33W is significant.

The working tributary interface 1W and the overhead interface 2W are connected to each other by two respective signal lines. A buffer 45W is disposed at an output signal line to the overhead interface 2W; a buffer 46W is disposed at an input signal line from the overhead interface 2W; a buffer 47W is connected in output signal line to the overhead interface 2P, and a buffer 48W is connected in an input signal line from the overhead interface 2P.

The two buffers 45W and 46W, which are connected to the overhead interface 2W, among the four buffers 45W, 46W, 47W and 48W become on-state only when the control signal SW outputted from the control circuit 33W is significant, and the two buffers 47W and 48W, which are connected to other overhead interface 2P, become on-state only when the control signal SP outputted from the control circuit 33W is significant.

In addition, reference numeral 32W if FIG. 3 designates a signal processing circuit which separates a signal inputted from the time slot interchange unit 10 into an overhead portion and a data portion to output them respectively to the overhead interface 2W or 2P side and the terminal unit (not shown) side, and composes an overhead portion inputted from the overhead interface 2W or 2P side and a data portion inputted from the terminal unit side into a frame to output the same to the time slot interchange unit 10 side.

Figure 4:
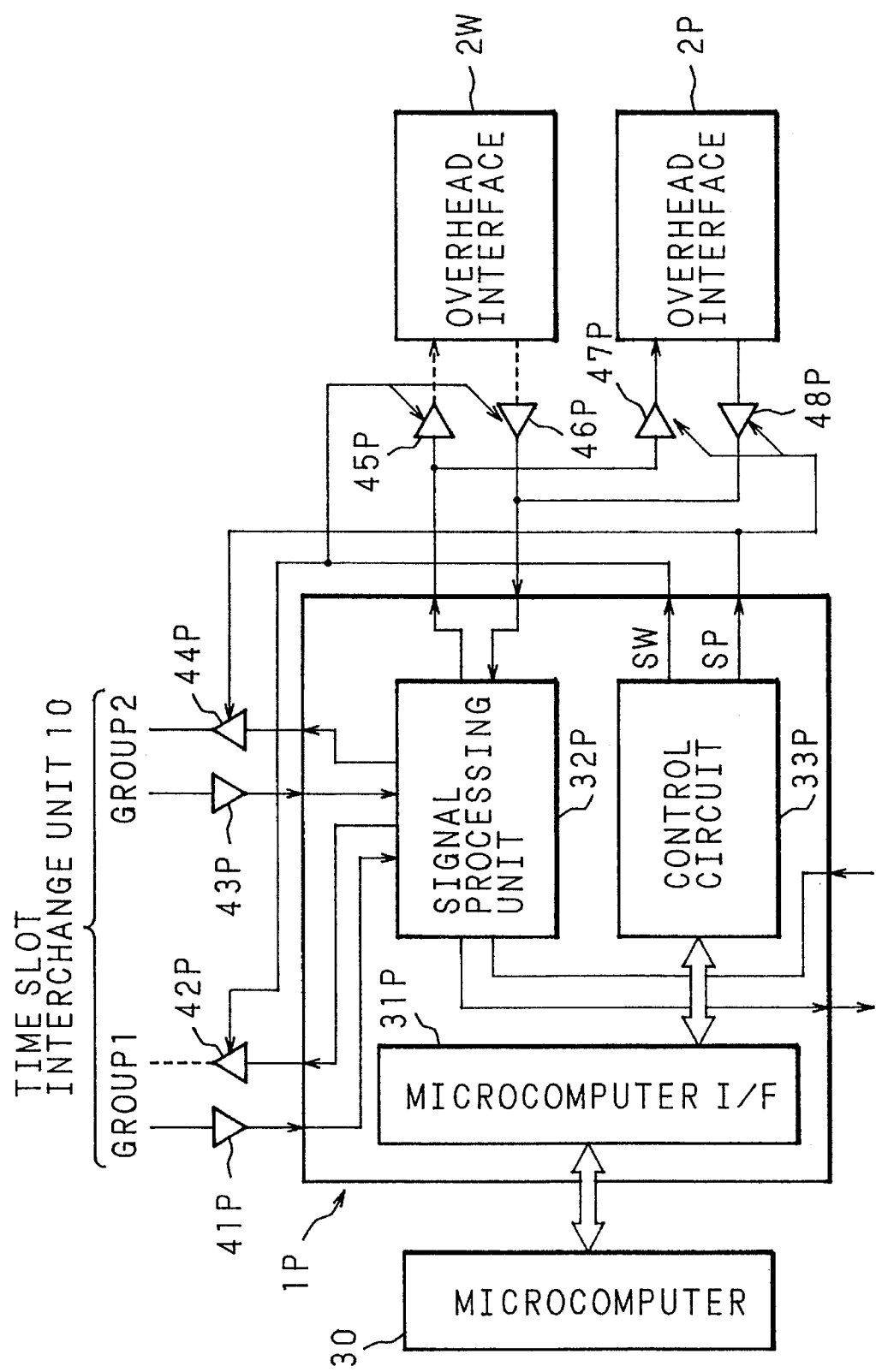
FIG. 4 is a block diagram showing a specific configuration of an embodiment of a protection tributary interface of the present invention.

FIG. 4 shows a block diagram of the example of the protection tributary interface 1P.

In FIG. 4, reference numeral 30 is the microcomputer 30 as shown in FIG. 3.

In the protection tributary interface 1P, a microcomputer interface (I/F) 31P and a control circuit 33P formed as a control means are built, which are the same as in the microcomputer interface (I/F) 31W and the control circuit 33W of the working tributary interface 1W.

Between the time slot interchange unit 10 and the protection tributary interface 1P, signals are transmitted/received by four signal lines. At a group 1 side, a buffer 41P is disposed at an input signal line from the line interface 11 and a buffer 42P is positioned at an output signal line to the line interface 11, and at a group 2 side, a buffer 43P is disposed at an input signal line from the line interface 12 and a buffer 44P is positioned at an output signal line to the line interface 12, respectively.

In addition, the two buffers 41P and 43P among the four buffers 41P, 42P, 43P and 44P are always in on-state, and the buffer 42P for outputting at the group 1 side becomes on-state only when the control signal SW outputted from the control circuit 33P is significant, and the buffer 44P for outputting at the group 2 side becomes on-state only when the control signal SP outputted from the control circuit 33P is significant.

The protection tributary interface 1P and the overhead interface 2W, and the interface 1P and the overhead interface 2P are respectively connected to each other two respective signal lines. A buffer 45P is disposed at an output signal line to the overhead interface 2W; a buffer 46P is positioned at an input signal line from the overhead interface 2W; a buffer 47P is connected in the output signal line to the overhead interface 2P, and a buffer 48P is connected in an input signal line from the overhead interface 2P.

The two buffers 45P and 46P, which are connected to the overhead interface 2W, among the four buffers 45P, 46P, 47P and 48P become on-state only when the control signal SP outputted from the control circuit 33P is significant, and the two buffer 47P and 48P, which are connected to the other overhead interface 2P, become on-state only when the control signal SP outputted from the control circuit 33P is significant.

In FIG. 4, reference numeral 32P denotes a signal processing unit which separates a signal inputted from the time slot interchange unit 10 into an overhead portion and a data portion to output them respectively into the overhead interface 2W or 2P and a terminal unit (not shown), and compose an overhead portion inputted from the overhead interface 2W and a data portion inputted from the terminal unit (not shown) side into a frame to output the same to the time slot interchange unit 10.

In such a configuration, each of the tributary interfaces 1W and 1P performs the outputting operation at the buffer of the group side which has been made on-state by the control signals SW, SP outputted from each of the control circuits 33W and 33P, and the buffer at the group side which has been set in off-state performs the high-impedance control.

Specifically, in the working tributary interface 1W shown in FIG. 3, when only the control signal SW outputted by the control circuit 33W is made significant, the buffers 42W, 45W and 46W are made in on-state, and the buffers 44W, 47W and 48W are in high-impedance state.

By such controls, since the signal lines shown by broken lines in FIG. 3 are in high-impedance state, the working tributary interface 1W is connected to the transmission system at the group 1 side and also to the overhead interface 2W.

On the other hand, in the protection tributary interface 1P shown in FIG. 4, when only the control signal SP outputted by the control circuit 33P is made significant, the buffers 44P, 47P and 48P are in on-state, and the buffers 42P, 45P and 46P are in high-impedance state.

By such controls, since the signal lines shown in FIG. 4 by broken lines are in high-impedance state, the protection tributary interface 1P is connected to the transmission system at the group 2 side, and is also connected to the overhead interface 2P.

In other words, the working tributary interface 1W is controlled so that the buffers 41W and 42W at the group 1 side are in on-state and the buffers 43W and 44W at the group 2 side are in off-state. The protection tributary interface 1P is controlled so that the buffers 41P and 42P at the group 1 side are in off-state and the buffers 43P and 44P are in on-state, respectively.

By such control, since the working tributary interface 1W interfaces a signal at the group 1 side and the protection tributary interface 1P interfaces a signal at the group 2 side, they can respectively operate independently.

The buffers 45W to 48W and 45P to 48P provided respectively for the overhead interfaces 2W and 2P are controlled similarly so that a signal at the group 1 side is processed in the overhead interface 2W and a signal at the group 2 side is processed in the overhead interface 2P.

Accordingly, in the whole tributary interface unit 1, as shown in FIG. 2 by solid lines, since the working tributary interface 1W is connected to the line interface 11 at the group 1 side and the protection tributary interface 1P is connected to the line interface 12 at the group 2 side, double number of tributary interfaces can be operated as compared to the conventional example.

In addition, for simplifying the explanation, an embodiment was described above, in which only one tributary interface unit is connected to the time slot interchange unit 10. However, the number of the tributary interfaces to be used is not limited.

As described above, according to the tributary interface of the invention, it becomes possible to respond immediately t a request from a user to increase the number of tributary interfaces, without designing a new apparatus. Therefore, time and costs for developing the design can be reduced.

Meanwhile, by controlling the interface units, each of which adopts a conventional redundant configuration, independently, it becomes possible to increase the number of the tributary interfaces to two times at maximum of the number of the interface units to have a latitude.

Further, the tributary interface of the present invention is constructed in advance so that it can be controlled by a microcomputer and can easily perform remote control.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalence of such meets and bounds thereof are therefore intended to be embraced by the claims.

What is claimed is:

1. A tributary interface unit for interfacing between a high order transmission system and the tributary interface unit, comprising a working tributary interface (1W) and a protection tributary interface (1P) connected as a pair for time slot interchanging with respect to said high order transmission system said working tributary interface (1W) and said protection tributary interface (1P) being each connected to said transmission system and each including means to control on-state and off-state thereof so that each said tributary interface operates independently from another tributary interface.

2. A tributary interface unit for interfacing between a high order transmission system including at least two groups and itself comprising a working tributary interface (1W) and a protection tributary interface (1P) used as a pair for time slot interchanging with respect to said high order transmission system, and further comprising:

first buffer means (41W, 42W) for switching the connecting state of said working tributary interface (1W) with respect to the one group of said high order transmission system;

second buffer means (43W, 44W) for switching the connecting state of said working tributary interface (1W) with respect to the other group of said high order transmission system;

third buffer means (41P, 42P) for switching the connecting state of said protection tributary interface (1P) with respect to the one group of said high order transmission system;

fourth buffer means (43P, 44P) for switching the connecting state of said protection tributary interface (1P) with respect to the other group of said high order transmission system;

first controlling means (33W) for controlling said first buffer means (41W, 42W) and said second buffer means (43W, 44W); and second controlling means (33P) for controlling said third buffer means (41P, 42P) and said fourth buffer means (43P, 44P);

wherein said working tributary interface (1W) and said protection tributary interface (1P) operate independently by connecting said working tributary interface (1W) only to the one group of said high order transmission system by controlling operation of said first controlling means (33W) and said protection tributary interface (1P) only to the other group of the high order transmission system by controlling operation of said second controlling means (33P).

3. A tributary interface unit for interfacing between two line interfaces of a high order transmission system, the tributary interface unit comprising a working tributary interface and a protection tributary interface coupled as a pair between said two line interfaces for time slot interchanging between said two line interfaces; each tributary interface being provided with an overhead interface, said working tributary interface including first buffer means for switching a connecting state of the working tributary interface with a first one of said two line interfaces, second buffer means for switching the connecting state of the working tributary interface with a second one of said two line interfaces, a first control circuit for controlling said first and second buffer means; said protection tributary interface including third buffer means for switching the connecting state of the protection tributary interface with said first one of the two line interfaces, fourth buffer means for switching the connecting state of the protection tributary interface with the second one of the two line interfaces, and a second control circuit for controlling said third and fourth buffer means; and fifth and sixth buffer means respectively coupled between said first to fourth buffer means and each overhead interface for enabling said working tributary interface and said protection tributary interface of the pair to operate independently from each other by connecting said working tributary interface only to said first of said line interfaces of said high order transmission system by controlling operation of said first controlling means and by connecting said protection tributary interface only to said second one of said line interfaces by controlling operation of said second controlling means.

* * * * *